C. G. FLEMING.
HARVESTING AND HUSKING MACHINE.
APPLICATION FILED JUNE 21, 1911.
1,037,826.
Patented Sept. 3, 1912.
3 SHEETS—SHEET 1.
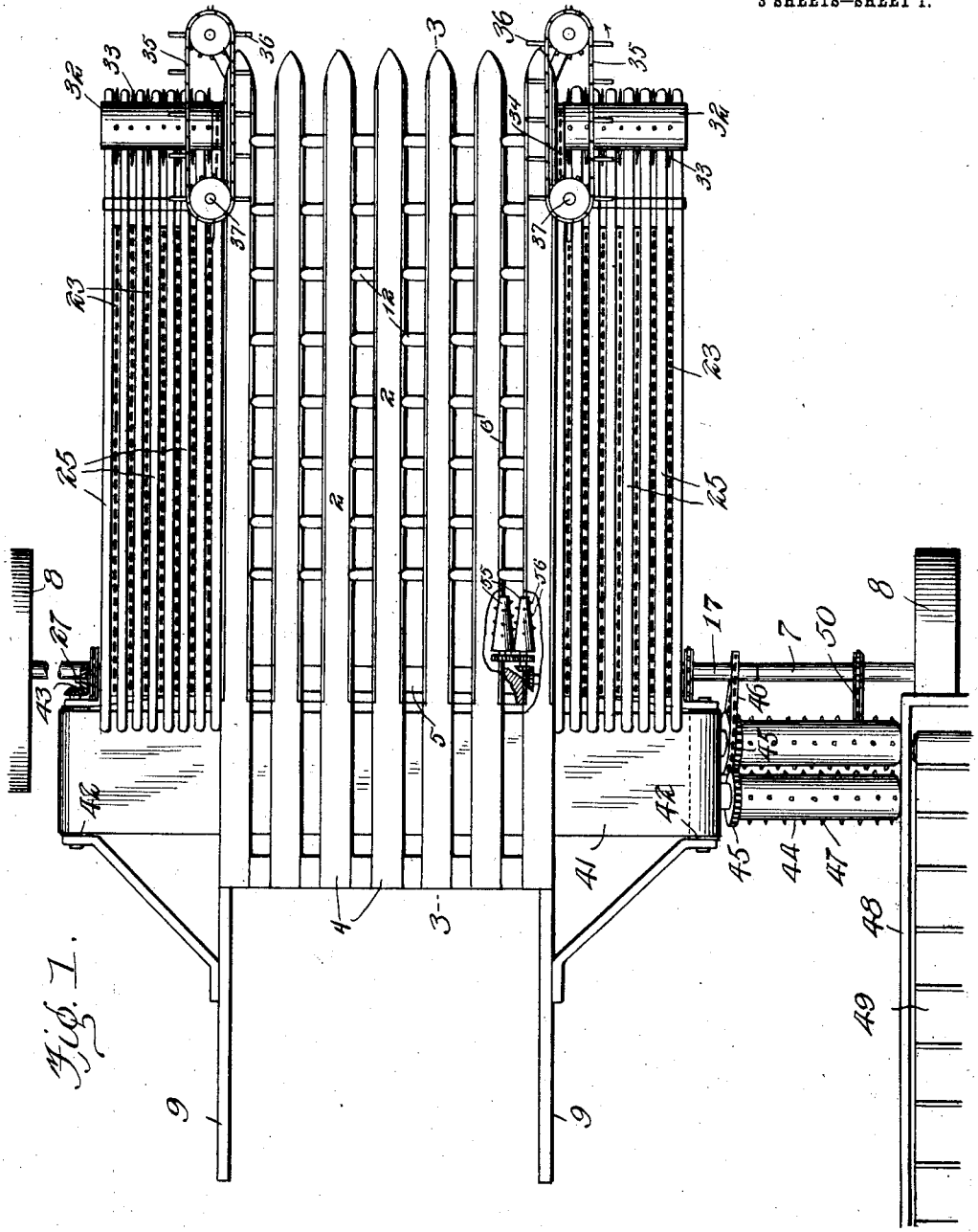
WITNESSES
INVENTOR
Clarence G. Fleming
Victor J. Evans
Attorney C. G. FLEMING.
HARVESTING AND HUSKING MACHINE.
APPLICATION FILED JUNE 21, 1911.
1,037,826.
Patented Sept. 3, 1912.
3 SHEETS—SHEET 2.
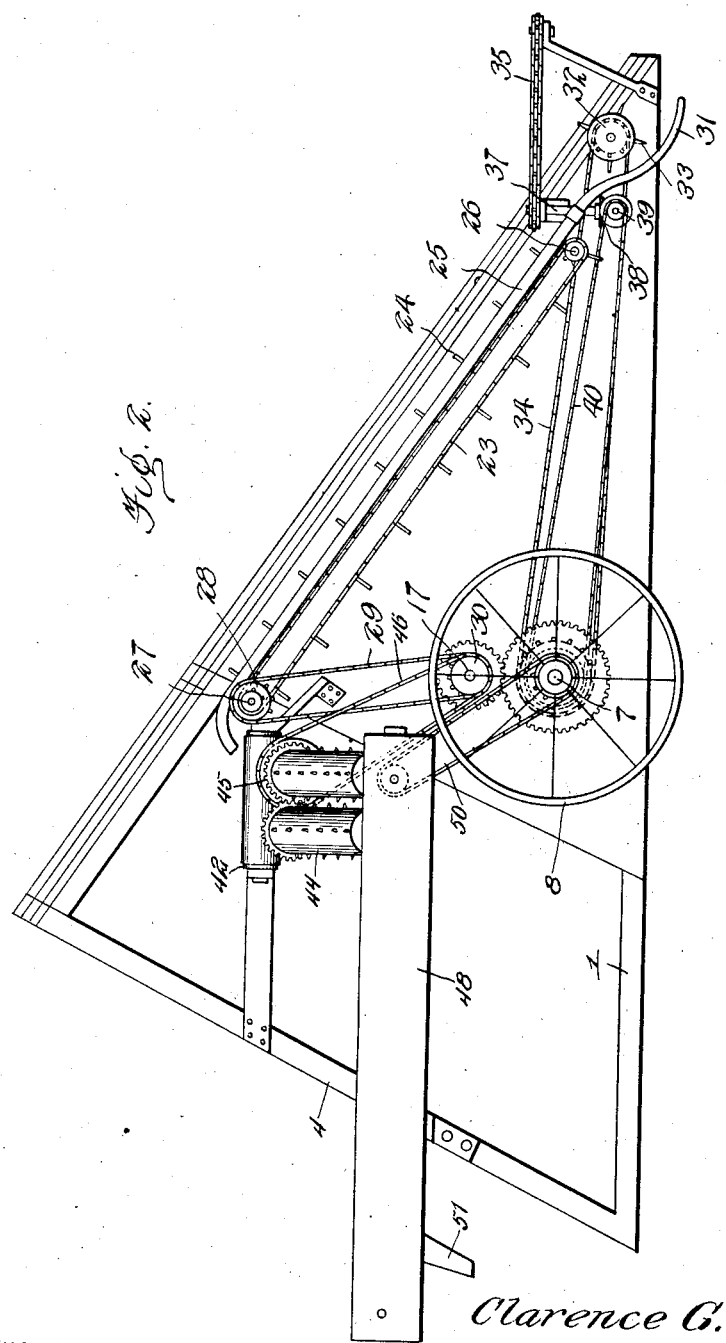
Witnesses
Louis R. Heinrichs
Wm Bagger
Inventor
Clarence G. Fleming
By Victor J. Evans
Attorney

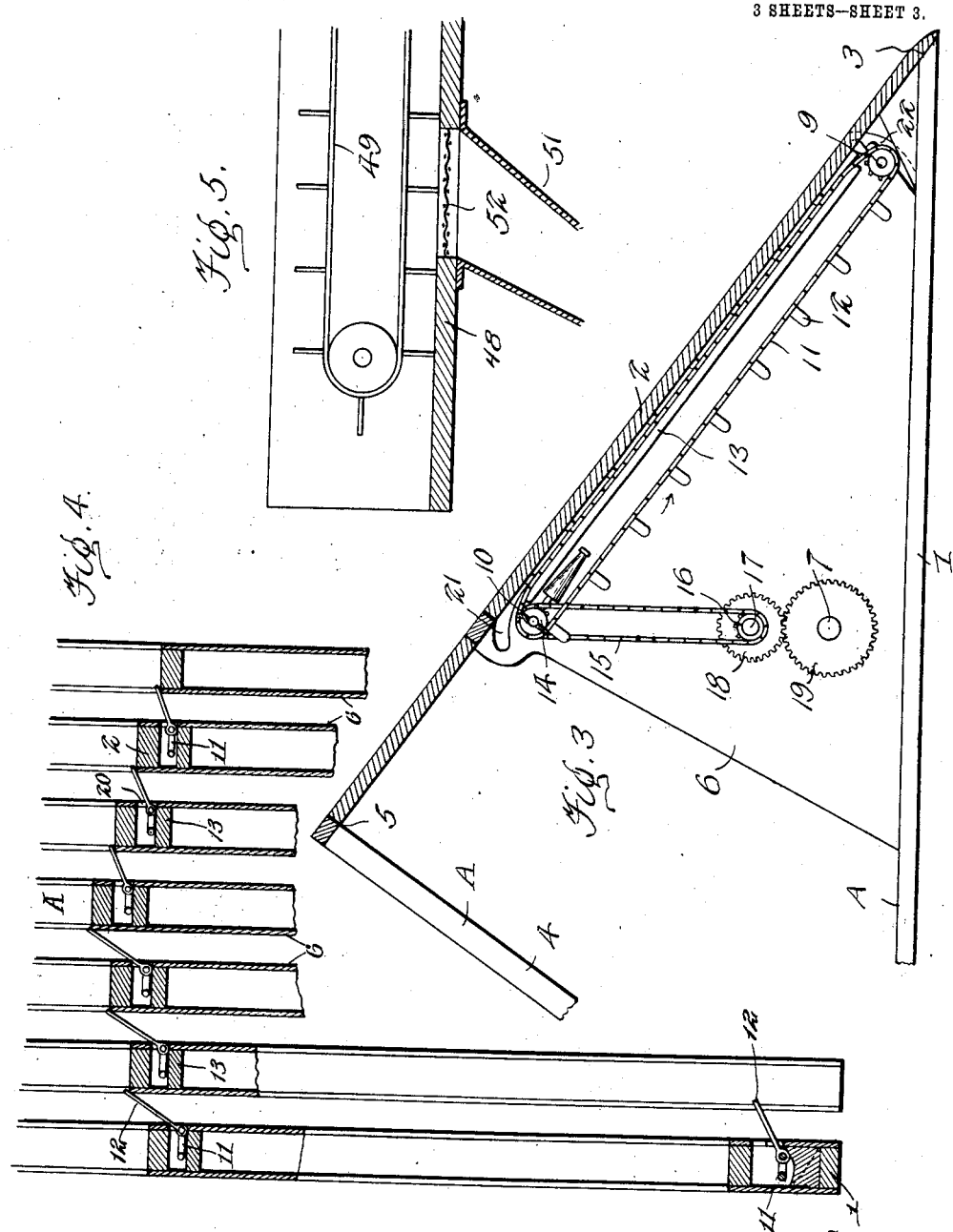

UNITED STATES PATENT OFFICE.

CLARENCE G. FLEMING, OF PHILLIPS, NEBRASKA.

HARVESTING AND HUSKING MACHINE.

1,037,826.  Specification of Letters Patent.  Patented Sept. 3, 1912.

Application filed June 21, 1911. Serial No. 634,418.

*To all whom it may concern:*

Be it known that I, CLARENCE G. FLEMING, a citizen of the United States, residing at Phillips, in the county of Hamilton and State of Nebraska, have invented new and useful Improvements in Harvesting and Husking Machines, of which the following is a specification.

This invention relates to corn harvesting and husking machines of that class in which a device adapted to be drawn over the field is constructed to engage one or more rows of corn, to strip the ears from the stalks which are left standing and to convey the ears to a husking device, whereby the husks are stripped from the ears previous to the discharge of the latter into a receptacle, such as a wagon driven alongside.

The present invention has for its object to provide simple and improved means whereby the down stalks will be raised and whereby the ears will be positively detached from all the stalks without danger of missing any portion thereof.

A further object of the invention is to provide a stalk lifting and guiding means of simple and improved construction having ear detaching means movably associated therewith.

Still further objects of the invention are to simplify and improve the general construction and operation of a machine of the character described.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a side elevation of the same. Fig. 3 is a sectional detail view taken on the plane indicated by the line 3—3 in Fig. 1. Fig. 4 is a front elevation partly in section of that portion of the machine which constitutes the stalk lifting and guiding and ear detaching mechanism. Fig. 5 is a vertical sectional detail view of the discharge spout illustrating also the shelled corn saving device.

Corresponding parts in the several figures are denoted by like characters of reference.

The frame of the improved machine comprises a plurality of triangular members A, each including an approximately horizontal bottom member 1, a top member 2 joining the front end of the bottom member at an acute angle, as shown at 3, and a downwardly and rearwardly inclined rear member 4, the juncture of which with the top member constitutes the apex 5 of the triangle. The top member 2 is connected with the bottom member 1 by means of plates 6 of sheet metal or other suitable material, combining with said top and bottom members to form housings or casings. The side members 6 of each of the triangular members are provided with bearings for an axle 7 having transporting wheels 8.

The frame structure of the machine includes suitable braces and other means for the attachment and support of the various moving parts and for the rearwardly extending tongues or push bars to which, in operation, the draft is applied.

The triangular members A are arranged in inverted V-shaped order, that is to say, the central one of said members is somewhat elevated above the adjoining members, which in turn are elevated slightly above those adjoining the outer sides or faces, and so on, as clearly indicated in Figs. 2 and 4, the members at the two extreme outer sides being lowermost. The top bars 2 of the said triangular members will thus combine to form two planes which intersect at the central bar and incline downwardly and outwardly, said planes being intersected by the vertical spaces between the several members.

Supported for rotation in the side members 6 slightly below the top members 2 are shafts 9 and 10 supporting sprocket wheels over which are guided endless chains 11, some of the links of which are provided with hingedly supported flaps 12. The upper lead of each endless chain 11 is supported upon a guide flange 13 whereby it is prevented from sagging. The upper shaft 10 has an auxiliary sprocket wheel 14 which is connected by an endless driving chain 15 with a sprocket wheel 16 upon a counter shaft 17 which is driven from the axle 7 by intermeshing gear wheels 18, 19. Motion in the proper direction will thus be transmitted from the axle to the endless chain 11 in each of the triangular housings constructed in the manner hereinbefore described.

The flaps 12 are adapted to project through a slot 20 in one side of the housing and are adapted to rest upon and to be guided in the upward movement upon the top bar 2 of the next adjoining housing. When the flaps 12 approach the upper ends of the respective housings they are guided over cam members 21, one of which is indicated in Fig. 3, so as to pass within the housing and to hang loosely depending on the downward course, as clearly indicated in Fig. 3. Adjacent to the shaft 9 supporting the lower end of each chain 11 is a cam or guide member 22 whereby the flaps 12, as the chain passes around the shaft 9, will be lifted or elevated so as to resume the position adjacent to the upper side of the next adjoining housing upon which said flaps are guided in their upward course.

The triangular housings or members A combine to form the gathering and ear detaching device of the improved machine, said triangular members or housings constituting the gathering arms, whereby the stalks are engaged, the down stalks being lifted and elevated, and the stalks are guided rearwardly between the said gathering arms, and the flaps of the endless chains serve not only to force the stalks rearwardly and upwardly, but said flaps also serve jointly with the arms to detach the ears from the stalks, the ears, as they are detached, being guided downwardly to either side of the machine over the top bars of the housings which, as previously described, are disposed in inverted V-shaped relation so that the ears will naturally gravitate to the sides of the device, the ears being also intercepted by the upwardly moving flaps 12, whereby they will be prevented from rolling downwardly and forwardly and thereby being lost in front of the machine. Adjacent to each side of the gathering device is supported an endless carrier composed of a plurality of suitably guided chains 23, see Figs. 1 and 2, the links of said chains being provided with ear engaging teeth or fingers 24 extending upwardly between spaced slats 25 which constitute the floors of the carriers. The endless chains 23 are supported adjacent to their lower and upper ends upon shafts 26, 27, the latter being equipped with sprocket wheels 28, each driven by a chain 29 from a sprocket wheel 30 upon the counter shaft 17. The lower ends of the slats 25 constituting the floors of the endless carriers are extended downwardly and forwardly to present curved scoop fingers 31 which are preferably slightly resilient and which are adapted to engage the ground so as to pick up any loose ears that may have become detached from the stalks.

Supported for rotation transversely above the scoop fingers 31 is a cylinder 32 having radially extending fingers 33 which serve to throw the loose ears upwardly and rearwardly upon the endless carrier chains 23 where they will be engaged by the fingers 24 so as to be carried upwardly along with the ears that are detached from the stalks by the gathering and ear detaching device. Each cylinder 32 is driven by a chain 34 from the axle 7.

Above and adjacent to the inner end of each of the ear gathering cylinders 32 is a horizontally disposed endless chain 35 some of the links of which are provided with outwardly extending fingers 36 which assist in gathering the stalks and guiding them between the arms formed by the housings or members A. The rear supporting shaft 37 of each chain 36 is connected by miter gearing 38 with a shaft 39 driven by a chain 40 from the axle 7.

The bottom and top bars 1 and 2 of the frames or members A are extended rearwardly of the side members or plates 6, and beneath the upper ends of the top bars 2 is supported an endless carrier 41 consisting of an apron mounted upon suitably supported rollers 42, one of which receives motion through miter gearing 43 from the supporting shaft 27 at the upper end of one of the carriers including the endless chains 23. This carrier receives the ears discharged over the upper ends of the slats 25 and conveys the said ears to suitably supported husking rollers 44 which are provided with intermeshing gears 45 and one of which is driven by means of an endless chain 46 from the shaft 17. The husking rollers are provided with husk stripping spikes 47, and said husking rollers are disposed in an inclined position so that the husked ears will be discharged over the lower ends of said rollers into a conveyer trough 48 having an endless conveyer or carrier 49 which is driven by means of an endless chain 50 from the axle of the machine. The conveyer trough 48 is provided near its discharge end with a spout 51 extending from the bottom thereof, said spout being obstructed by a screen 52 which admits of the passage of corn accidentally shelled from the ears, such shelled corn being discharged through the spout 51 into some suitable receptacle. The whole ears will pass over the screen 52 and will be discharged by the carrier or conveyer 49 over the end of the conveyer trough or casing into some suitable receptacle, such as the box of a wagon driven alongside of the machine.

For the purpose of assisting in drawing the stalks downward through the spaces between the casings or housings A and particularly for the purpose of pulling downward through said spaces any stalks that have become broken or partly detached, it is preferred to support adjacent to the upper ends of the chains 13 in the respective housings small rollers 55 which may be of tapering or conical shape, as shown, so that the stalks will be readily engaged therebetween, said rollers being also preferably provided with spurs or projections 56 serving to seize the stalks and pull the same forcibly in a downward direction. These rollers may be driven from the respective shafts 10 in any suitable and convenient manner.

From the foregoing description, taken in connection with the drawings hereto annexed, the operation and advantages of this invention will be readily understood by those skilled in the art to which it appertains.

It is obvious that while in the drawings a machine has been shown which is adapted to operate only upon a single row of plants, the principle of the invention is equally capable of being applied to a machine adapted to operate simultaneously upon two or more rows.

The general construction of the machine is simple and inexpensive, and it will be found that while all the ears are detached from the stalks and the ears which have been accidentally detached will be gathered by this device, the result will be accomplished with an expenditure of comparatively slight power and without waste of time or labor.

Having thus described the invention, what is claimed as new, is:—

1. In a machine of the character described, a gathering device comprising a plurality of gathering arms each consisting of a triangular frame having a downwardly and forwardly inclined top bar, said frames being supported in spaced relation with the inclined top bars combining to form two planes which intersect at the central bar and incline downwardly and outwardly.

2. In a device of the character described, a gathering device comprising a plurality of arms each consisting of a triangular frame having a downwardly and forwardly inclined top bar, said frames being supported in spaced relation and with the inclined top bars combining to form two planes which intersect at the central bar and incline downwardly and outwardly, said frames being provided with side plates constituting housings and with endless movable members supported within said housings and having stalk and ear engaging flaps extending therethrough.

3. In a device of the character described, a gathering device comprising a plurality of arms each consisting of a triangular frame having a downwardly and forwardly inclined top bar, said arms being supported in spaced relation and with the inclined top bars combining to form two planes which intersect at the central bar and incline downwardly and outwardly, and said arms being provided with side plates constituting housings, endless movable members within said housings, flaps hingedly associated with the endless movable members, extending through one side of the housing and adapted to be supported in their upward course upon the next adjoining frame or arm, and means to guide said flaps within the housing at the upper limit of the movement and to project from the housing at the lower limit of the movement.

4. In a device of the character described, a gathering device comprising a plurality of arms each consisting of a triangular frame, having a downwardly and forwardly inclined top bar, said frames being supported in spaced relation and with the inclined top bars combining to form two planes which intersect at the central bar and incline downwardly and outwardly, and said frames being provided with side plates constituting housings, an axle extending through the side plates and having supporting wheels, a counter shaft extending through the side plates, endless chains supported within the several housings adjacent to the top members thereof, intermeshing gears upon the axle and the counter shaft, means for transmitting motion from the counter shaft to the endless chains, flaps hingedly associated with the chains and projecting through the sides of the housings to engage the top bar of an adjacent frame, and cam-shaped guides to engage said flaps at the upper and lower limits of their movements.

5. In a device of the character described, stalk engaging and ear gathering means comprising a plurality of arms consisting of triangular frames each having a downwardly and forwardly inclined top bar, said frames being supported in spaced relation and with the inclined top bars combining to form two planes which intersect at the central bar and incline downwardly and outwardly, endless stalk engaging and ear detaching means associated with said frames, ear carrying devices supported adjacent to the two sides of the inverted V-shaped series of gathering members, a transverse carrier supported adjacent to the discharge ends of the ear carrying devices, husking means supported adjacent to the discharge end of the transverse carrier, and a conveyer trough to receive the ears discharged over the husking means, said conveyer trough being equipped with a shelled corn screen and discharge spout.

6. In a device of the character described, a gathering device comprising a plurality of arms, each consisting of a triangular frame having a downwardly and forwardly inclined top bar, said frames being supported in spaced relation and with the inclined top bars combining to form two planes which intersect at the central bar and incline downwardly and outwardly, said frames being provided with side plates constituting housings, with endless movable members supported within said housings and having stalk and ear engaging flaps extending therethrough and with stalk engaging rollers supported adjacent to the upper ends of the movable members.

In testimony whereof I affix my signature in presence of two witnesses.

CLARENCE G. FLEMING.

Witnesses:
 CHAS. S. BROWN,
 J. G. POLEG.

Copies of this patent may be obtained for five cents each, by addressing the "Commissioner of Patents, Washington, D. C."